United States Patent
Liu et al.

(10) Patent No.: US 11,347,381 B2
(45) Date of Patent: May 31, 2022

(54) DYNAMIC SYNCHRONIZED IMAGE TEXT LOCALIZATION

(71) Applicant: International Business Machines Corporation, Armonk, NY (US)

(72) Inventors: Su Liu, Austin, TX (US); Yang Liang, Ma Lian Dao (CN); Debbie Anglin, Williamson, TX (US); Cheng Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

(21) Appl. No.: 16/440,010

(22) Filed: Jun. 13, 2019

(65) Prior Publication Data

US 2020/0393941 A1 Dec. 17, 2020

(51) Int. Cl.
*G06F 3/0484* (2022.01)
*G06T 11/60* (2006.01)
*G06F 40/58* (2020.01)
*G06F 40/106* (2020.01)
*G06F 40/109* (2020.01)

(52) U.S. Cl.
CPC .......... *G06F 3/0484* (2013.01); *G06F 40/106* (2020.01); *G06F 40/109* (2020.01); *G06F 40/58* (2020.01); *G06T 11/60* (2013.01)

(58) Field of Classification Search
None
See application file for complete search history.

(56) References Cited

U.S. PATENT DOCUMENTS

| 7,073,137 | B2 | 7/2006 | Hassanin et al. |
| 7,953,591 | B2 | 5/2011 | Chakra et al. |
| 8,813,046 | B2 | 8/2014 | Nair et al. |
| 9,104,661 | B1 * | 8/2015 | Evans ..................... G06F 40/40 |

(Continued)

FOREIGN PATENT DOCUMENTS

CN 109522816 A 3/2019

OTHER PUBLICATIONS

Vivek Yadav, Chandrashekar Ramanathan; "Automated layout preservation in cross language translation of document: an integrated approach and implementation"; Compute '14: Proceedings of the 7th ACM India Computing Conference, Oct. 2014, Article No. 4 pp. 1-8; https://doi.org/10.1145/2675744.2675750 (Year: 2014).*

(Continued)

*Primary Examiner* — Benjamin Smith
(74) *Attorney, Agent, or Firm* — Garg Law Firm, PLLC; Rakesh Garg; Nathan Rau (57) ABSTRACT

A set of images and a corresponding set of textual information are received, such that a first textual information is to be presented with a first image. The first textual information is translated into a set of translated textual information, each textual information in the set of translated textual information corresponding to a language in a set of languages. A set of layout parameters is determined for at least one translated textual information. The translated textual information is transformed according to the set of layout parameters and overlaid on the first image. The overlaying causes a pixel of the transformed translated textual information to be superimposed on a pixel of the first image.

20 Claims, 5 Drawing Sheets

(56) References Cited

U.S. PATENT DOCUMENTS

| | | | |
|---|---|---|---|
| 9,342,503 | B1 | 5/2016 | Evans et al. |
| 9,424,255 | B2* | 8/2016 | Pengelly .................. G06F 40/58 |
| 9,442,923 | B1* | 9/2016 | Abou Mahmoud .... G06F 40/42 |
| 9,465,782 | B2* | 10/2016 | Travieso ................ G06F 40/117 |
| 9,514,426 | B2 | 12/2016 | Cherusseri et al. |
| 9,881,002 | B1* | 1/2018 | Qureshi .................. G06F 40/40 |
| 10,007,535 | B1* | 6/2018 | Chopra ................... G06F 9/454 |
| 10,250,838 | B1* | 4/2019 | Herz .................. H04N 21/4316 |
| 10,291,678 | B2* | 5/2019 | Pique Corchs .... G06K 9/00288 |
| 10,706,322 | B1* | 7/2020 | Yang ....................... G06K 9/726 |
| 10,956,767 | B2* | 3/2021 | Lee ........................ G06F 40/263 |
| 2004/0148591 | A1 | 7/2004 | Kumhyr et al. |
| 2004/0260535 | A1* | 12/2004 | Chen ........................ G06F 9/543 704/9 |
| 2006/0204111 | A1* | 9/2006 | Koshi ..................... G06T 11/60 382/229 |
| 2008/0066136 | A1* | 3/2008 | Dorai .................. G06F 16/7834 725/135 |
| 2008/0082317 | A1* | 4/2008 | Rosart ..................... G06F 40/58 704/8 |
| 2008/0097745 | A1* | 4/2008 | Bagnato .................. G06F 40/58 704/8 |
| 2008/0172637 | A1* | 7/2008 | Chang .................... G06F 40/58 715/846 |
| 2008/0233980 | A1* | 9/2008 | Englund ................. G06F 40/58 455/466 |
| 2009/0048820 | A1* | 2/2009 | Buccella ................. G06F 40/58 704/2 |
| 2009/0063129 | A1* | 3/2009 | Tsai ........................ G06F 40/58 704/3 |
| 2009/0177733 | A1 | 7/2009 | Talker |
| 2009/0313005 | A1* | 12/2009 | Jaquinta ................. G06F 40/58 704/2 |
| 2011/0209044 | A1* | 8/2011 | Kutsumi ................ G06T 11/60 715/232 |
| 2012/0016655 | A1* | 1/2012 | Travieso ............. G06F 16/9566 704/2 |
| 2012/0016656 | A1* | 1/2012 | Travieso ................ G06F 40/45 704/2 |
| 2012/0016929 | A1* | 1/2012 | Travieso ............... G06F 16/957 709/203 |
| 2012/0159430 | A1 | 6/2012 | Waldbaum et al. |
| 2012/0240039 | A1* | 9/2012 | Walker .................. G06Q 10/10 715/265 |
| 2013/0004068 | A1* | 1/2013 | Koo ........................ G06K 9/342 382/165 |
| 2013/0114849 | A1* | 5/2013 | Pengelly ............ G06K 9/00979 382/103 |
| 2013/0117008 | A1* | 5/2013 | Condie ................... G06F 40/14 704/2 |
| 2013/0132825 | A1* | 5/2013 | Masuko ................ G06F 40/117 715/236 |
| 2014/0104312 | A1* | 4/2014 | Zaltzman ................ G06T 11/60 345/632 |
| 2014/0310585 | A1* | 10/2014 | Masuko ................ G06F 40/169 715/230 |
| 2014/0365858 | A1* | 12/2014 | Travieso ............... G06F 16/958 715/229 |
| 2015/0026121 | A1 | 1/2015 | Shani et al. |
| 2016/0035116 | A1* | 2/2016 | Masuko ................ G06K 9/6203 382/167 |
| 2016/0140112 | A1* | 5/2016 | Masuko ................. G09G 5/363 704/3 |
| 2016/0299890 | A1* | 10/2016 | Masuko ................ G06K 9/6217 |
| 2016/0321574 | A1 | 11/2016 | Peterson |
| 2016/0350692 | A1 | 12/2016 | Doganata et al. |
| 2018/0097866 | A1* | 4/2018 | Pique Corchs ......... G06T 11/60 |
| 2019/0215475 | A1* | 7/2019 | Herz .................. H04N 21/4316 |
| 2019/0266432 | A1* | 8/2019 | Lee .................... G06K 9/00671 |
| 2020/0257544 | A1* | 8/2020 | Im ........................... G06F 9/454 |
| 2020/0393941 | A1* | 12/2020 | Liu ....................... G06F 3/0484 |

OTHER PUBLICATIONS

International Searching Authority, PCT/IB2020/055474, dated Sep. 16, 2020, pp. 1-9.

Dils, Minimum Theme: How to Lay Text over an Image, Dec. 30, 2012, pp. 1-31, https://carriedils.com/textoverlay-image/.

Robin Gale Cornett, Add a Widget Area to Overlay the Featured Image in Genesis, Jan. 11, 2016, pp. 1-29, https://robincornett.com/featured-image-overlay-widget-area/.

WP Sites, Display Widget Text Content Over Image In Genesis, 2014, pp. 1-7, https://wpsites.net/web-design/display-widgettext-content-over-image-in-genesis/.

Stack Overflow, Change the font based on language CSS, Sep. 13, 2014, pp. 1-3, https://stackoverflow.com/questions/25827756/change-the-font-based-on-language-css.

Dantas, jQuery Text Fill, Dynamic Text Boxes, 2014, pp. 1-5, http://jquery-textfill.github.io/.

* cited by examiner

DYNAMIC SYNCHRONIZED IMAGE TEXT LOCALIZATION

TECHNICAL FIELD

The present invention relates generally to a method, system, and computer program product for generating localized image text in a local language. More particularly, the present invention relates to a method, system, and computer program product for dynamic synchronized image text localization.

BACKGROUND

Designers and authors generate content including textual information when performing tasks such as, authoring documents, generating marketing material, and generating help information. A local language is a language used in a particular geolocation. Image based advertising needs to be translated to local language(s) in order to be useful to consumers. A designer chooses layouts for textual information based on a set of characteristics for a local language. For example, certain languages require a left-to-right layout, right-to-left layout, top down layout, bottom up layout, or any combination. These examples are not intended to be limiting. Currently, a designer must select a local language for use with the advertising image, choose a corresponding layout, and repeat this process for any number of local languages necessary to complete the content generation task. If the designer seeks to modify a content of the textual information, the process must be repeated to update each translated image.

SUMMARY

The illustrative embodiments provide a method, system, and computer program product for dynamic synchronized image text localization.

An embodiment receives a set of images, each image in the set of images corresponding to a textual information in a set of textual information such that a first textual information from the set of textual information is to be presented with a first image from the set of images. The embodiment translates the first textual information into a set of translated textual information, each textual information in the set of translated textual information corresponding to a language in a set of languages. The embodiment determines a set of layout parameters for at least one translated textual information from the set of translated textual information. The embodiment transforms the at least one translated textual information according to the set of layout parameters. The embodiment overlays the transformed at least one translated textual information on the first image, wherein the overlaying causes a pixel of the transformed at least one translated textual information to be superimposed on a pixel of the first image.

Another embodiment further determines, as a part of determining the set of layout parameters, a directionality parameter of the at least one translated textual information, wherein the transforming arranges the at least one translated textual information in a layout according to a direction specified in the directionality parameter.

Another embodiment further determines, as a part of determining the set of layout parameters, an orientation parameter of the at least one translated textual information, wherein the transforming orients a layout of the at least one translated textual information according to an orientation specified in the orientation parameter.

Another embodiment further determines, as a part of determining the set of layout parameters, a font type of the at least one translated textual information, wherein the transforming arranges the at least one translated textual information in a layout using a font type specified in the font type parameter.

Another embodiment further determines, as a part of determining the set of layout parameters, a color of the at least one translated textual information, wherein the transforming renders the at least one translated textual information in a layout using a color specified in the color parameter.

Another embodiment further determines, as a part of determining the set of layout parameters, a font size of the at least one translated textual information, wherein the transforming arranges the at least one translated textual information in a layout using a font size specified in the font size parameter.

Another embodiment further determines, as a part of determining the set of layout parameters, a font style of the at least one translated textual information, wherein the transforming arranges the at least one translated textual information in a layout using a font style specified in the font style parameter.

Another embodiment further determines a language of the first textual information, wherein the set of languages selected in the translating is dependent upon the language of the first textual information.

Another embodiment further determines determining a geographic locale corresponding to the language of the first textual information, wherein the set of languages selected in the translating is dependent upon the geographic locale.

Another embodiment further detects a modification of the first textual information, wherein the translating is responsive to the modification such that the translating and the overlaying is adaptive to a dynamic characteristic of the first textual information.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

In an embodiment, the program instructions are stored in a computer readable storage device in a data processing system, and wherein the program instructions are transferred over a network from a remote data processing system.

In an embodiment, the program instructions are stored in a computer readable storage device in a server data processing system, and wherein the program instructions are downloaded over a network to a remote data processing system for use in a computer readable storage device associated with the remote data processing system.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein generally relate to generating textual information for image based advertising. In accordance with various embodiments, textual information consists of a set of words, phrases, and/or sentences overlaid on an image. Overlaying (and other noun or verb variations of the word "overlay" used herein) includes placing textual information over a background image. Thus, when the textual information is positioned over the background image graphical data representative of the text of the textual information, e.g., the pixels of the text, are superimposed on the graphical data of the background image, in one of many possible ways. For example, the superimposition may replace a pixel of the background image with a pixel of the textual information, may combine the value of a pixel of the background image with the value of a pixel of the textual information to create a transparency or other effect which showing the textual information as well as the background image, may alternately switch showing a pixel of the background image and a pixel of the textual information, or some combination thereof.

Existing textual information editing tools can modify the textual information. For example, the modification may alter, replace, or in other ways change the textual information to a new textual information.

In an embodiment, an application receives a set of images, each image having a corresponding set of textual information. In an embodiment, an application detects a modification of a first textual information of the set of textual information overlaid on a first image. In an embodiment, an application detects a set of layout parameters of the first textual information. In a particular embodiment, an application determines a directionality parameter of the first textual information. For example, textual information in a given language can be written right-to-left, left-to-right, top to bottom, or in some other suitable manner.

In a particular embodiment, an application determines an orientation parameter of the first textual information. For example, textual information in a given language can be written horizontally, vertically, or some combination thereof. In a particular embodiment, an application determines a font type of the first textual information. In an embodiment, the first textual information includes a set of font types. In a particular embodiment, an application determines a color of the first textual information. In a particular embodiment, the first textual information includes a set of colors. In a particular embodiment, an application determines a font size of the first textual information. In an embodiment, the first textual information includes a set of font sizes.

In an embodiment, an application determines a font style of the first textual information. For example, the first textual information can be bolded, italicized, underlined, subscripted, superscripted, or some combination of these and other font styles. In an embodiment, the first textual information includes a set of font styles. In an embodiment, an application determines a language of the first textual information. In an embodiment, an application determines a geographic locale corresponding to the language of the first textual information.

In an embodiment, an application translates the first textual information into a set of textual information, each textual information in the set of textual information corresponding to a language in a set of languages. In an embodiment, an application receives a second set of layout parameters for at least one textual information in the set of textual information. In an embodiment, an application overlays the at least one textual information on the first image. In an embodiment, an application formats the at least one textual information according to the second set of layout parameters.

The illustrative embodiments are described with respect to certain types of layout parameters, languages, user interfaces, textual information, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments.

Additional or different advantages may be realized by specific illustrative embodiments. Furthermore, a particular illustrative embodiment may have some, all, or none of the advantages listed above.

Figure 1:
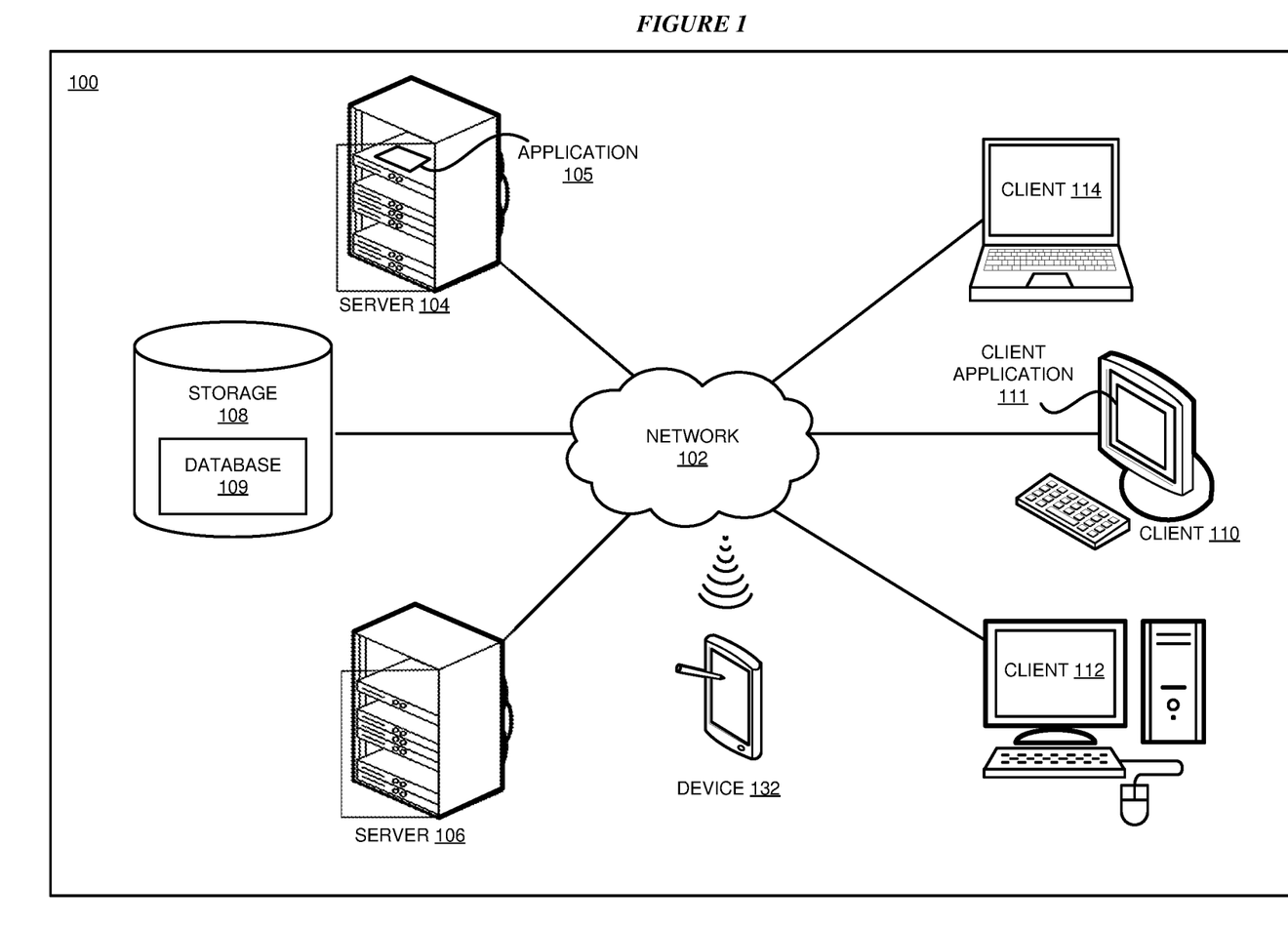
FIG. 1 depicts a block diagram of a network of data processing systems in which illustrative embodiments may be implemented.
Figure 2:
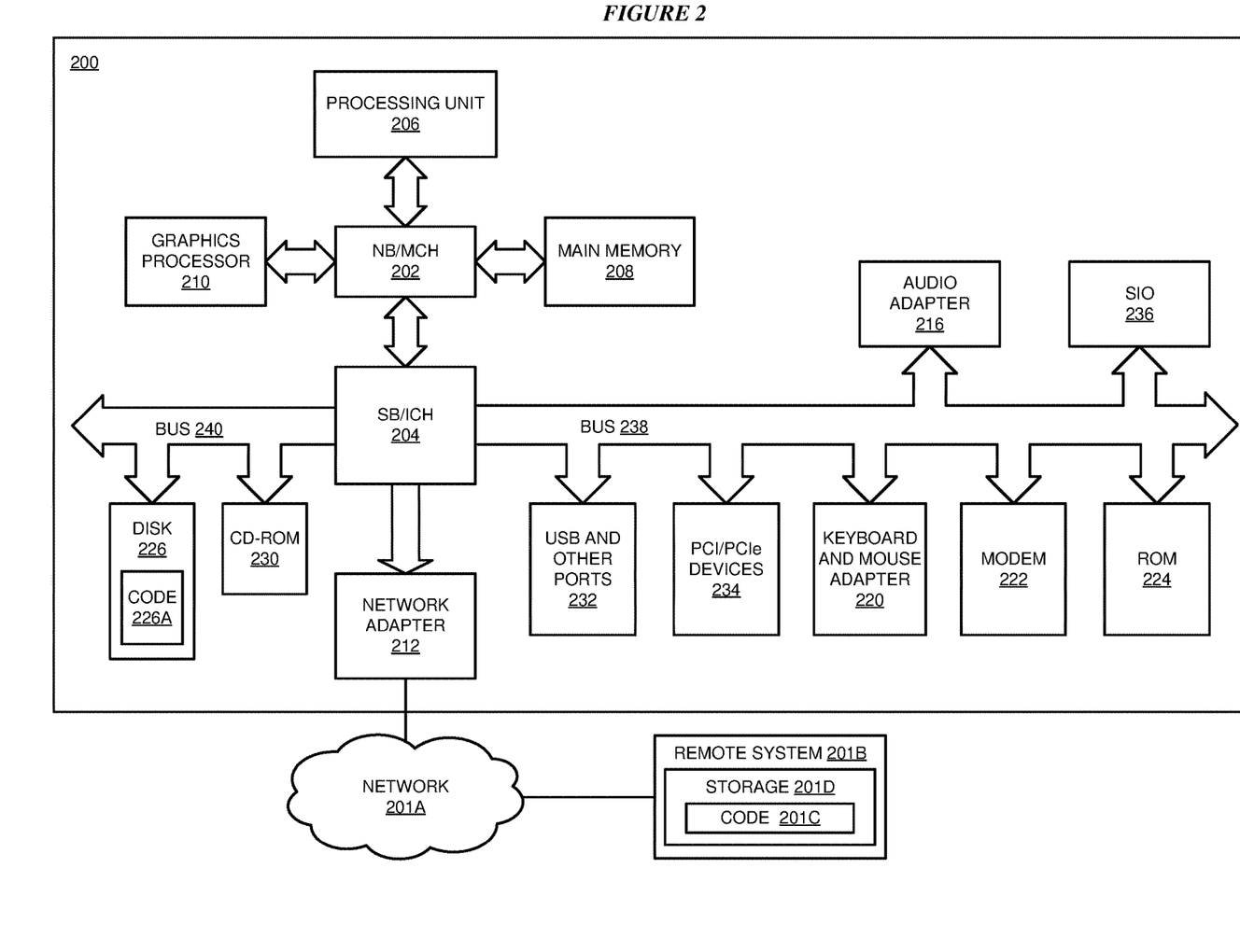
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store textual information, image data sets, user preferences, and/or user generated content within a database 109. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a PDA, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 of server 104 implements an embodiment of an algorithm for generating textual information for image based advertising in a network environment as described herein. Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as cognitive application 105 and document authoring application 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
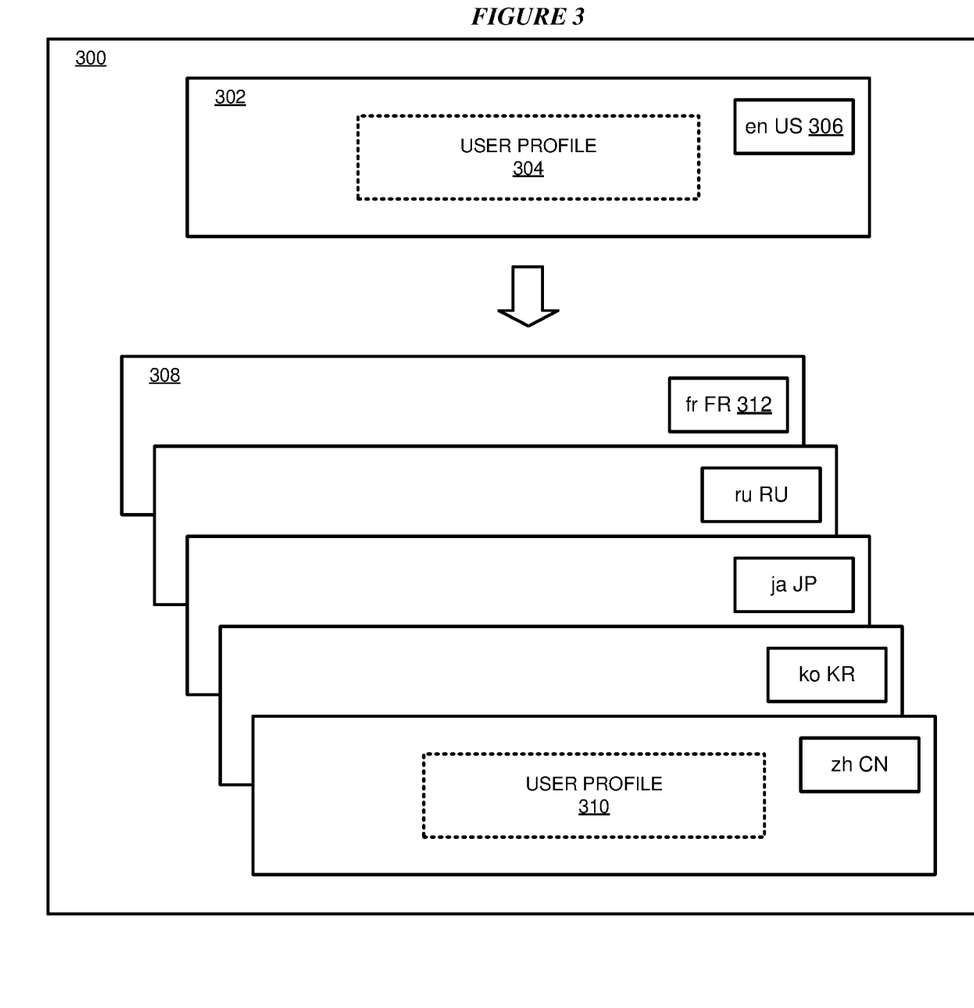
FIG. 3 depicts a block diagram of a configuration for dynamic synchronized image text localization in accordance with an illustrative embodiment.

With respect to FIG. 3, this figure depicts a block diagram of a configuration 300 for dynamic synchronized image text localization in accordance with an illustrative embodiment. Image 302 includes a set of textual information 304 in a language 306. Textual information 304 includes content "USER PROFILE" in the English language. An application, such as application 105, generates a set of images 308. An application translates textual information 304 into a new textual information 310 in a set of languages 312.

Figure 4:
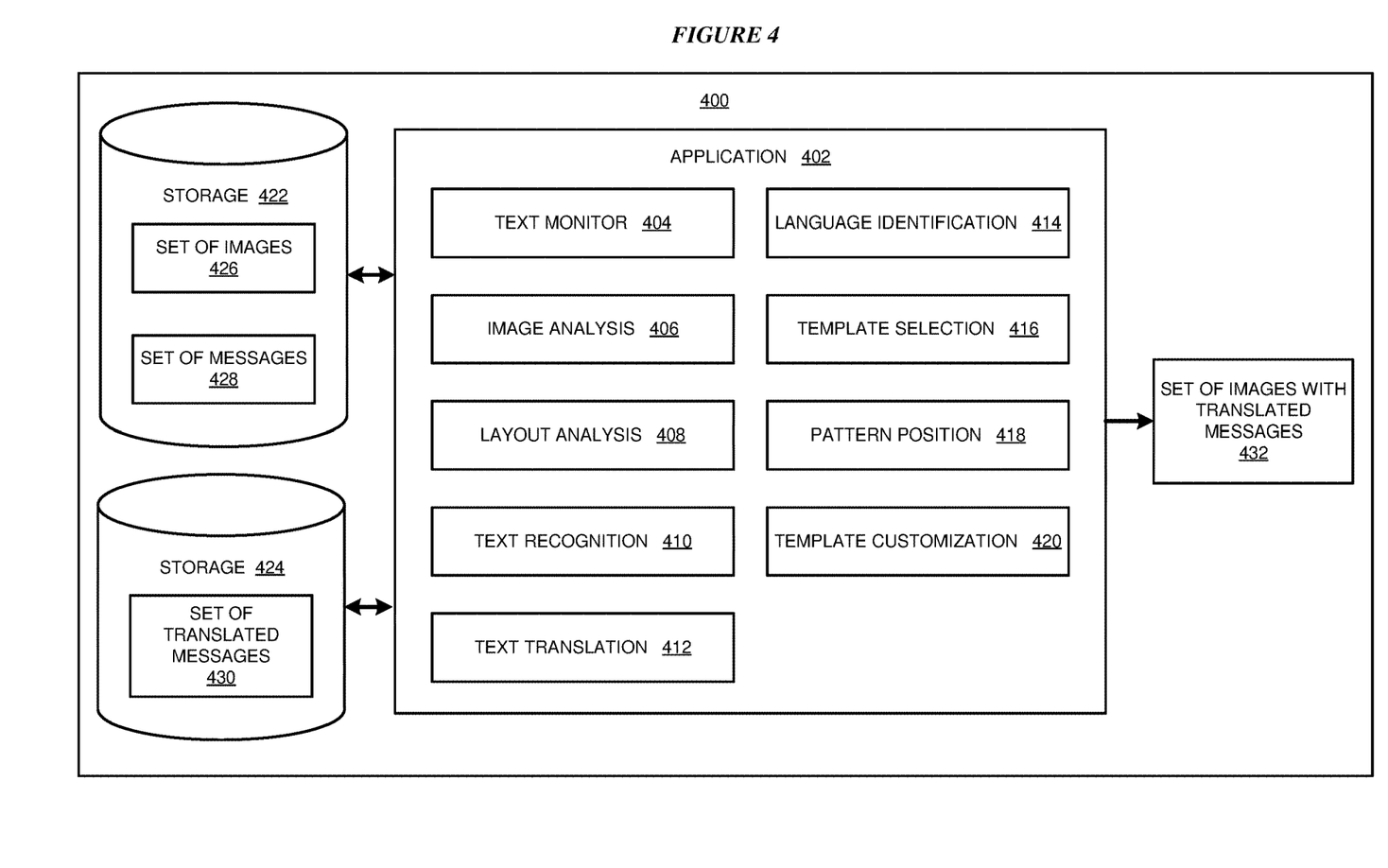
FIG. 4 depicts an example configuration for dynamic synchronized image text localization in accordance with an illustrative embodiment.

With respect to FIG. 4, this figure depicts an example configuration for dynamic synchronized image text localization in accordance with an illustrative embodiment. Configuration 400 includes an application 402, a first storage database 422, and a second storage database 424. Application 402 is an example of application 105 in FIG. 1. Storage databases 422, 424 are an example of storage 108 in FIG. 1.

Application 402 receives a set of images 426 and a set of messages 428. In an embodiment, the set of messages 428 includes a set of textual information, a first textual information of the set of textual information overlaid on a first image of the set of images 426. In an embodiment, text monitor component 404 determines a modification to at least one textual information. For example, text monitor component 404 detects the at least one textual information is altered. In an embodiment, image analysis component 406 detects a set of layout parameters of the first textual information. In a particular embodiment, image analysis component 406 determines a directionality parameter of the first textual information. For example, textual information in a given language can be written right-to-left, left-to-right, or some combination thereof.

In a particular embodiment, layout analysis component 408 determines an orientation parameter of the first textual information. For example, textual information in a given language can be written horizontally, vertically, or some combination thereof. In a particular embodiment, layout analysis component 408 determines a font type of the first textual information. In an embodiment, the first textual information includes a set of font types. In a particular embodiment, layout analysis component 408 determines a color of the first textual information. In a particular embodiment, the first textual information includes a set of colors. In a particular embodiment, layout analysis component 408 determines a font size of the first textual information. In an embodiment, the first textual information includes a set of font sizes.

In an embodiment, layout analysis component 408 determines a font style of the first textual information. For example, the first textual information can be bolded, italicized, underlined, subscripted, superscripted, or some combination thereof. In an embodiment, the first textual information includes a set of font styles. In an embodiment, language identification component 414 determines a language of the first textual information. In an embodiment, language identification component 414 determines a geographic locale corresponding to the language of the first textual information.

In an embodiment, text translation component 412 translates the first textual information into a set of textual information, each textual information in the set of textual information corresponding to a language in a set of languages. In an embodiment, application 402 stores the set of textual information in storage 424 as a set of translated messages 430. In an embodiment, layout analysis component 408 determines a second set of layout parameters for at least one textual information of the set of textual information. In an embodiment, template selection component 416 selects the second set of layout parameters. In an embodiment, pattern position component 418 formats the at least one textual information according to the second set of layout parameters. In an embodiment, template customization component 420 alters the second set of layout parameters according to a set of user preferences. Application 402 generates a set of images with translated messages 432.

Figure 5:
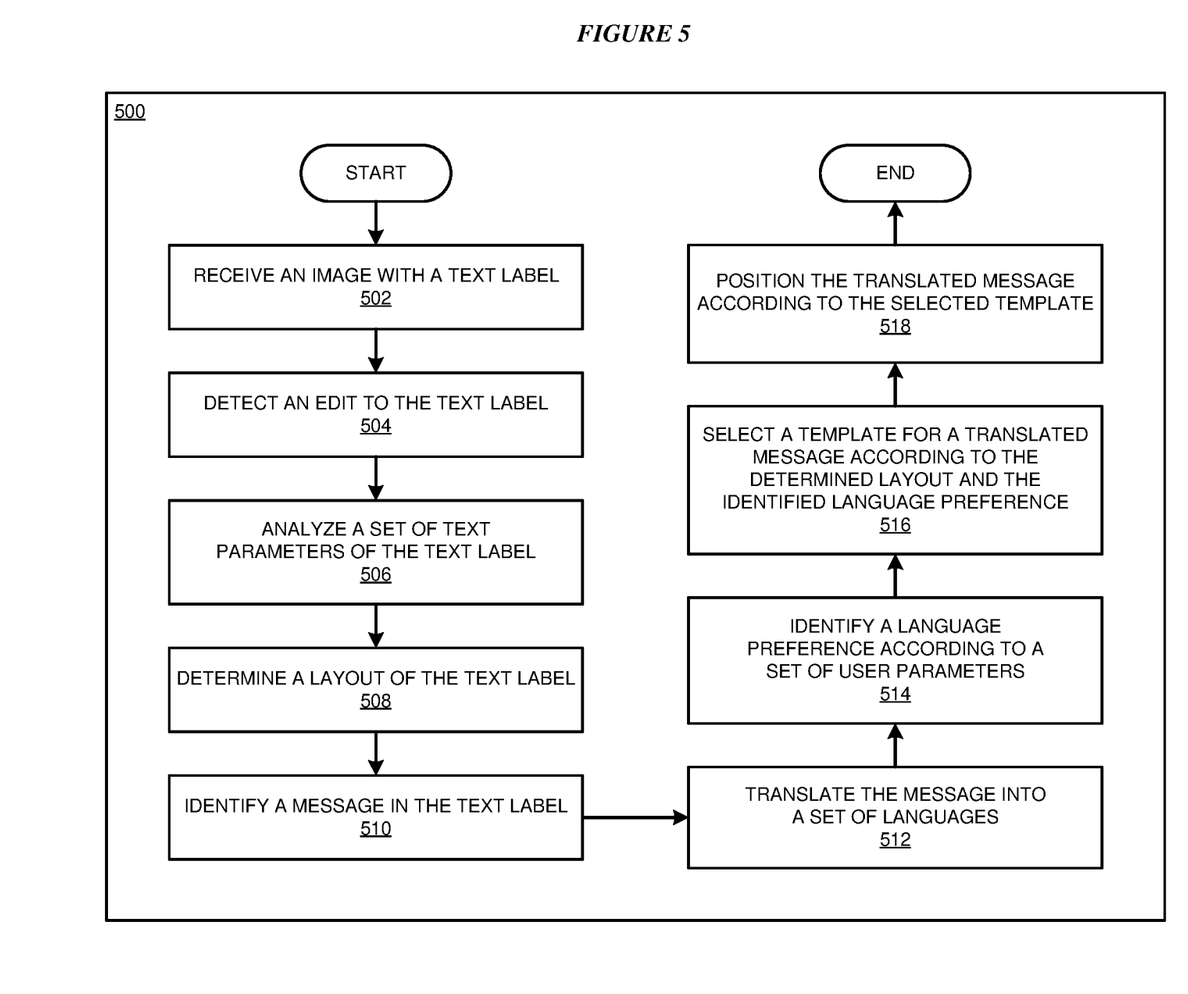
FIG. 5 depicts a flowchart of an example process for dynamic synchronized image text localization in in accordance with an illustrative embodiment.

With reference to FIG. 5, this figure depicts a flowchart of an example process for dynamic synchronized image text localization in accordance with an illustrative embodiment. In one or more embodiments, process 500 can be implemented in application 105.

In block 502, application 105 receives an image with a textual information. For example, an input may supply the image data and data of the textual information separately to application 105, where the application is expected to overlay the textual information (or a variant thereof) onto the image, as described herein. As another example, another input may provide application 105 an input that includes the combined data of the image and the textual information.

The supplied textual information may be usable as-is for the overlaying in the manner of an embodiment, or may have to be modified before overlaying. For example, the supplied textual information may be edited, or may change before overlaying in the manner of an embodiment. In a dynamic scenario, an image may have to be overlaid with textual information that is dynamic, i.e., changing with time or events. In such cases, an edit or a change in the textual information has to be detected so that the translation and overlaying of the translated textual information on a background image can keep up with, i.e., be adaptive to, the changing incoming textual information.

When the supplied textual information is edited, application 105 detects an edit to the textual information, in block 504. In block 506, application 105 analyzes a set of text parameters of the textual information. The detection of the editing may be performed in any suitable manner. For example, editing can be detected by comparing the supplied textual information with a different version of the textual information stored in a location. Editing can also be detected by sensing an event in a data processing system where the event is indicative of an editor application accessing a location of storage of the supplied textual information. Many other ways of detecting the editing of textual information will be apparent from this disclosure to those of ordinary skill in the art and the same are contemplated within the scope of the illustrative embodiments.

In block 508, application 105 determines a layout of the textual information. For example, as described herein, application 105 uses a set of layout parameters associated with the textual information, either from a user input, a default configuration, a contextual specification computed based upon the context of the image and/or the textual information, or some combination thereof. As described herein, the set of layout parameters include, but are not limited to a directionality parameter, an orientation parameter, font, font style, size, color, blink or blink-rate, and animation characteristic.

In block 510, application 105 identifies a message in the textual information. The message in the textual information is the content of the textual information data, which is provided in a particular natural language. In block 512, application 105 translates the message into a set of languages, each language in the set of languages being a natural language. Any suitable language translation tool can be utilized for performing the translation of block 512. When more than one language is selected in the set for translation, one or more translated messages may be generated. If more than one translated message is produced, a variety of overlaying possibilities exist, as described at block 518.

In block 514, application 105 identifies a language preference according to a set of user parameters. In block 516, application 105 selects a template for a translated message according to the determined layout and the identified language preference. A set of templates is available to an embodiment from which a template can be selected according to one or more selection criterion. The selection criterion includes, but is not limited to, a language of the translated message to be overlaid on a given image using the template, a layout or a layout parameter according to which the translated message is to be overlaid, or some combination thereof. For example, if multiple templates are available for messages translated to Mandarin language, one of those multiple templates may be selected so that the selected template is at most the size (are) of the image, or a determined portion thereof, and not more.

In block 518, application 105 positions the translated message according to the selected template. Process 500 is ended thereafter.

The positioning of block 518 causes the selected template containing the translated message to occupy a position relative to the input image and be overlaid by application 105 at that position in a manner described earlier. When more than one translated message in different languages are produced at block 512, a variety of positioning and overlaying alternatives is possible and contemplated within the scope. For example, one embodiment selects a first translated message in a first template, overlays on the image, and causes the image overlaid with the first translated message to be presented at a first time. The embodiment selects a second translated message in a second template, overlays on the image, and causes the image overlaid with the second translated message to be presented at a second time. Two or more translated messages can be presented in this manner at different times in succession, and the various translated messages can be rotated through in this manner over a period of time.

As another example, another embodiment selects a first translated message in a first template, overlays the first translated message on the image at a first position, selects a second translated message in a second template, overlays the second translated message on the image at a second position, and causes the image overlaid with the first and second translated messages at different positions to be presented. A combination is also possible and contemplated where messages from a first subset of translated messages are positioned and overlaid at different positions, presented at a first time, and messages from a second subset of translated messages are positioned and overlaid at different positions, and presented at a second time. These examples of positioning and overlaying of one or more translated messages are not intended to be limiting. From this disclosure, those of ordinary skill in the art will be able to conceive many other ways of positioning and overlaying one or more translated messages and the same are contemplated within the scope of the illustrative embodiments.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving a set of images, each image in the set of images corresponding to textual information in a set of textual information, wherein a first image from the set of images is overlaid with first textual information from the set of textual information;
detecting a modification of the first textual information by detecting a new message overlaying the first image;
translating the new message in the first information into a plurality of translated messages, wherein each translated message in the plurality of translated messages is translated to a respective different language in a plurality of different languages;
determining a set of layout parameters for at least one translated message from the plurality of translated messages,
wherein the at least one translated message comprises first and second translated messages, and
wherein the determining of the set of layout parameters comprises determining a first layout parameter associated with a first format of the first translated message and a second layout parameter associated with a second format of a second translated message;
identifying a language of the first translated message as a language preference of a user;
selecting a template for the first translated message based at least in part on the set of layout parameters and the language preference;
transforming the at least one translated message according to the set of parameters, wherein the transforming comprises transforming the first translated message into the first format according to the first layout parameter and transforming the second translated message into the second format according to the second layout parameter; and
overlaying each of the first and second translated messages in succession on the first image, the overlaying including overlaying the first translated message in the first format on the first image followed by overlaying the second translated message in the second format on the first image, wherein the overlaying of the first translated message includes positioning the first translated message according to the template and causing a pixel of the first translated message to be superimposed on a pixel of the first image.

2. The method of claim 1, further comprising:
determining, as a part of determining the set of layout parameters, a directionality parameter of the at least one translated message, wherein the transforming arranges the at least one translated message in a layout according to a direction specified in the directionality parameter.

3. The method of claim 1, further comprising:
determining, as a part of determining the set of layout parameters, an orientation parameter of the at least one translated message, wherein the transforming orients a layout of the at least one translated message according to an orientation specified in the orientation parameter.

4. The method of claim 1, further comprising:
determining, as a part of determining the set of layout parameters, a font type of the at least one translated message, wherein the transforming arranges the at least one translated message in a layout using a font type specified in the font type parameter.

5. The method of claim 1, further comprising:
determining, as a part of determining the set of layout parameters, a color of the at least one translated message, wherein the transforming renders the at least one translated message in a layout using a color specified in the color parameter.

6. The method of claim 1, further comprising:
determining, as a part of determining the set of layout parameters, a font size of the at least one translated message, wherein the transforming arranges the at least one translated message in a layout using a font size specified in the font size parameter.

7. The method of claim 1, further comprising:
determining, as a part of determining the set of layout parameters, a font style of the at least one translated message, wherein the transforming arranges the at least one translated message in a layout using a font style specified in the font style parameter.

8. The method of claim 1, further comprising:
determining a language of the first textual information, wherein the plurality of languages selected in the translating is dependent upon the language of the first textual information.

9. The method of claim 1, further comprising:
determining a geographic locale corresponding to the language of the first textual information, wherein the plurality of languages selected in the translating is dependent upon the geographic locale.

10. The method of claim 1, wherein the determining of the set of layout parameters comprises receiving a layout parameter for formatting the translated message as a user input.

11. A computer usable program product comprising a computer-readable storage medium, and program instructions stored on the storage medium, the stored program instructions comprising:
program instructions to receive a set of images, each image in the set of images corresponding to textual information in a set of textual information, wherein a first image from the set of images is overlaid with first textual information from the set of textual information;
program instructions to detect a modification of the first textual information by detecting a new message overlaying the first image;
program instructions to translate the new message in the first information into a plurality of translated messages, wherein each translated message in the plurality of translated messages is translated to a respective different language in a plurality of different languages;
program instructions to determine a set of layout parameters for at least one translated message from the plurality of translated messages,
wherein the at least one translated message comprises first and second translated messages, and
wherein the program instructions to determine the set of layout parameters comprises program instructions to determine a first layout parameter associated with a first format of the first translated message and program instructions to determine a second layout parameter associated with a second format of a second translated message;
program instructions to identify a language of the first translated message as a language preference of a user;
program instructions to select a template for the first translated message based at least in part on the set of layout parameters and the language preference;
program instructions to transform at least one translated message according to the set of parameters, wherein the program instructions to transform comprises program instructions to transform the first translated message into the first format according to the first layout parameter and program instructions to transform the second translated message into the second format according to the second layout parameter; and
program instructions to overlay each of the first and second translated messages in succession on the first image, the overlaying including overlaying the first translated message in the first format on the first image followed by overlaying the second translated message in the second format on the first image, wherein the overlaying of the first translated message includes positioning the first translated message according to the template and causing a pixel of the first translated message to be superimposed on a pixel of the first image.

12. The computer usable program product of claim 11, further comprising:
program instructions to determine, as a part of determining the set of layout parameters, a directionality parameter of the at least one translated message, wherein the program instructions to transform arranges the at least one translated message in a layout according to a direction specified in the directionality parameter.

13. The computer usable program product of claim 11, further comprising:
program instructions to determine, as a part of determining the set of layout parameters, an orientation parameter of the at least one translated message, wherein the program instructions to transform orients a layout of the at least one translated message according to an orientation specified in the orientation parameter.

14. The computer usable program product of claim 11, further comprising:
program instructions to determine, as a part of determining the set of layout parameters, a font type of the at least one translated message, wherein the program instructions to transform arranges the at least one translated message in a layout using a font type specified in the font type parameter.

15. The computer usable program product of claim 11, further comprising:
program instructions to determine, as a part of determining the set of layout parameters, a color of the at least one translated message, wherein the program instructions to transform renders the at least one translated message in a layout using a color specified in the color parameter.

16. The computer usable program product of claim 11, further comprising:
program instructions to determine, as a part of determining the set of layout parameters, a font size of the at least one translated message, wherein the program instructions to transform arranges the at least one translated message in a layout using a font size specified in the font size parameter.

17. The computer usable program product of claim 11, further comprising:
program instructions to determine, as a part of determining the set of layout parameters, a font style of the at least one translated message, wherein the program instructions to transform arranges the at least one translated message in a layout using a font style specified in the font style parameter.

18. The computer usable program product of claim 11, wherein the program instructions are stored in a computer readable storage medium in a data processing system, and wherein the program instructions are transferred over a network from a remote data processing system.

19. The computer usable program product of claim 11, wherein the program instructions are stored in a computer readable storage medium in a server data processing system, and wherein the program instructions are downloaded over a network to a remote data processing system for use in a computer readable storage medium associated with the remote data processing system.

20. A computer system comprising a processor, a computer-readable memory, and a computer-readable storage device, and program instructions stored on the storage device for execution by the processor via the memory, the stored program instructions comprising:
program instructions to receive a set of images, each image in the set of images corresponding to textual information in a set of textual information, wherein a first image from the set of images is overlaid with first textual information from the set of textual information;

program instructions to detect a modification of the first textual information by detecting a new message overlaying the first image;

program instructions to translate the new message in the first information into a plurality of translated messages, wherein each translated message in the plurality of translated messages is translated to a respective different language in a plurality of different languages;

program instructions to determine a set of layout parameters for at least one translated message from the plurality of translated messages, wherein the at least one translated message comprises first and second translated messages, and wherein the program instructions to determine the set of layout parameters comprises program instructions to determine a first layout parameter associated with a first format of the first translated message and program instructions to determine a second layout parameter associated with a second format of a second translated message;

program instructions to identify a language of the first translated message as a language preference of a user;

program instructions to select a template for the first translated message based at least in part on the set of layout parameters and the language preference;

program instructions to transform at least one translated message according to the set of parameters, wherein the program instructions to transform comprises program instructions to transform the first translated message into the first format according to the first layout parameter and program instructions to transform the second translated message into the second format according to the second layout parameter; and program instructions to overlay each of the first and second translated messages in succession on the first image, the overlaying including overlaying the first translated message in the first format on the first image followed by overlaying the second translated message in the second format on the first image, wherein the overlaying of the first translated message includes positioning the first translated message according to the template and causing a pixel of the first translated message to be superimposed on a pixel of the first image.

* * * * *